(12) United States Patent
Kunugise (10) Patent No.: US 11,086,101 B2
(45) Date of Patent: Aug. 10, 2021

(54) IMAGING LENS AND IMAGING APPARATUS

(71) Applicant: FUJIFILM Corporation, Tokyo (JP)

(72) Inventor: Takashi Kunugise, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 316 days.

(21) Appl. No.: 16/401,561

(22) Filed: May 2, 2019

(65) Prior Publication Data

US 2019/0258027 A1  Aug. 22, 2019

Related U.S. Application Data

(63) Continuation of application No. PCT/JP2017/039192, filed on Oct. 30, 2017.

(30) Foreign Application Priority Data

Nov. 15, 2016 (JP) .............................. JP2016-222150

(51) Int. Cl.
*G02B 9/62* (2006.01)
*G02B 27/00* (2006.01)
(Continued)

(52) U.S. Cl.
CPC ............... *G02B 9/62* (2013.01); *G02B 13/04* (2013.01); *G02B 27/0025* (2013.01); *H04N 5/2254* (2013.01); *G02B 7/36* (2013.01)

(58) Field of Classification Search
CPC .... G02B 27/0025; G02B 13/04; G02B 5/005; G02B 9/62; G02B 7/36; H04N 5/2254
(Continued)

(56) References Cited

U.S. PATENT DOCUMENTS 9,851,529 B2 * 12/2017 Asami .................. G02B 15/142
9,851,542 B2 * 12/2017 Huang ................. G02B 13/146
(Continued)

FOREIGN PATENT DOCUMENTS

JP    H07-181376 A    7/1995
JP    2004-219610 A   8/2004
(Continued)

OTHER PUBLICATIONS

International Search Report issued in PCT/JP2017/039192; dated Jan. 23, 2018.
(Continued)

*Primary Examiner* — Evelyn A Lester
(74) *Attorney, Agent, or Firm* — Studebaker & Brackett PC (57) ABSTRACT

The imaging lens consists of, in order from an object side, a negative first lens group immovable during focusing, a stop and a positive second lens group moving during focusing. The first lens group consists of, in order from the object side, a meniscus lens having a convex surface toward the object side, a negative meniscus lens having a convex surface toward the object side, a negative lens, a biconvex lens, a negative meniscus lens having a convex surface toward the object side, and a positive lens having a convex surface toward the object side. Predetermined conditional expressions concerning a focal length f of the entire system, a focal length f1 of the first lens group, and a shape of an air lens between first and second lenses of the first lens group from an image side are satisfied.

15 Claims, 6 Drawing Sheets

EXAMPLE 1

(51) Int. Cl.
*H04N 5/225* (2006.01)
*G02B 13/04* (2006.01)
*G02B 7/36* (2021.01)

(58) Field of Classification Search
USPC ....... 359/680, 682, 683, 684, 717, 740, 753, 359/793
See application file for complete search history.

(56) References Cited

U.S. PATENT DOCUMENTS

| | | |
|---|---|---|
| 2004/0136095 A1 | 7/2004 | Suzuki |
| 2014/0126072 A1* | 5/2014 | Ohashi .................. G02B 13/04 359/753 |
| 2016/0085049 A1* | 3/2016 | Tomioka .............. G02B 15/142 359/755 |
| 2016/0282590 A1 | 9/2016 | Saito et al. |
| 2019/0086650 A1* | 3/2019 | Kunugise ........... G02B 27/0025 |
| 2019/0086651 A1* | 3/2019 | Okada .................. G02B 13/22 |

FOREIGN PATENT DOCUMENTS

| | | |
|---|---|---|
| JP | 2012-027450 A | 2/2012 |
| JP | 2015-152811 A | 8/2015 |
| JP | 2016-012034 A | 1/2016 |
| JP | 2016-180851 A | 10/2016 |

OTHER PUBLICATIONS

International Preliminary Report on Patentability and Written Opinion issued in PCT/JP2017/039192; dated May 21, 2019.

\* cited by examiner

FIG. 1

EXAMPLE 1

FIG. 2

EXAMPLE 2

FIG. 3

EXAMPLE 3

FIG. 5
EXAMPLE 2

FIG. 7

IMAGING LENS AND IMAGING APPARATUS

CROSS REFERENCE TO RELATED APPLICATIONS

The present application is a Continuation of PCT International Application No. PCT/JP2017/039192 filed on Oct. 30, 2017, which claims priority under 35 U.S.C. § 119(a) to Japanese Patent Application No. 2016-222150 filed on Nov. 15, 2016. Each of the above applications is hereby expressly incorporated by reference in its entirety, into the present application.

BACKGROUND OF THE INVENTION

1. Field of the Invention

The present invention relates to an imaging lens and an imaging apparatus. In particular, the present invention relates to an imaging lens, which is appropriate for a factory automation (FA) camera, a machine vision (MV) camera, a surveillance camera, a digital camera, a cinema camera, and the like, and an imaging apparatus comprising the imaging lens.

2. Description of the Related Art

Examples of imaging lenses which can be used for cameras in the above field and which are well known include imaging lenses described in JP2004-219610A, JP1995-181376A(JP-H07-181376A), and JP2012-027450A. A lens system disclosed in JP2004-219610A includes a negative lens group, a stop, and a positive lens group in order from the object side. A lens system disclosed in JP1995-181376A (JP-H07-181376A) includes a negative lens group, a positive lens group, a stop, and a positive lens group in order from the object side. A lens system disclosed in JP2012-027450A includes a first lens group, a stop, and a second lens group that has a positive refractive power in order from the object side.

SUMMARY OF THE INVENTION

MV cameras are required to capture objects of various shapes at various object distances and, in some cases, to make detection with higher precision. Hence, it is required that the used imaging lens has a focusing function and has small fluctuation in aberration due to focusing, particularly, fluctuation in spherical aberration and astigmatism. In addition, it is preferable that the imaging lens used for cameras in the above fields including the MV camera has a small F number, and desirably has high performance despite its wide angle.

However, the lens system disclosed in JP2004-219610A has a large F number, and the lens system disclosed in JP1995-181376A (JP-H07-181376A) has a problem of the narrow angle of view. In the lens system having six lenses in the first lens group, which is disclosed in JP-A-2012-027450A, since a method of performing focusing by moving only one set of cemented lenses in the first lens group is implemented, aberration fluctuation due to focusing is considered to be large.

The present invention has been made in consideration of the above-mentioned situation, and its object is to provide an imaging lens that has small fluctuation in spherical aberration and astigmatism due to focusing, has a wide angle and a small F number, and has a favorable optical performance, and an imaging apparatus having the imaging lens.

An imaging lens according to the present invention consists of, in order from an object side, a first lens group fixed with respect to an image plane during focusing and having a negative refractive power as a whole, a stop, and a second lens group moving during focusing and having a positive refractive power as a whole, in which the first lens group consists of, in order from the object side, a first lens that is a meniscus lens having a convex surface toward the object side, a second lens that is a meniscus lens having a convex surface toward the object side and having a negative refractive power, a third lens having a negative refractive power, a fourth lens having a biconvex shape and having a positive refractive power, a fifth lens that is a meniscus lens having a convex surface toward the object side and having a negative refractive power, and a sixth lens having a convex surface toward the object side and having a positive refractive power, and Conditional Expressions (1) and (2) are satisfied, $$-0.4 < f/f1 < -0.2 \tag{1}$$

$$0.3 < (R6f - R5r)/(R6f + R5r) < 0.8 \tag{2}$$

where f is a focal length of a whole system in a state where an object at infinity is in focus, f1 is a focal length of the first lens group, R6f is a curvature radius of a surface of the sixth lens on the object side, and R5r is a curvature radius of a surface of the fifth lens on an image side.

In the imaging lens according to the present invention, it is preferable to satisfy at least one of Conditional Expressions (3) to 6, (1-1) to (6-1).

$$1.68 < N \min \tag{3}$$

$$32 < vave \tag{4}$$

$$0 < vd4 - vd6 < 40 \tag{5}$$

$$8 < TTL/f < 12 \tag{6}$$

$$0.37 < f/f1 < -0.22 \tag{1-1}$$

$$0.4 < (R6f - R5r)/(R6f + R5r) < 0.65 \tag{2-1}$$

$$1.72 < N \min < 1.9 \tag{3-1}$$

$$36 < vave < 55 \tag{4-1}$$

$$19 < vd4 - vd6 < 36 \tag{5-1, and}$$

$$9 < TTL/f < 11 \tag{6-1}$$

where

Nmin is a refractive index of the negative lens having the smallest refractive index at the d line in the first lens, the second lens and the third lens, vave is an average value of Abbe numbers of the negative lenses based on the d line in the first lens, the second lens and the third lens, vd4 is an Abbe number of the fourth lens based on a d line, vd6 is an Abbe number of the sixth lens based on a d line, TTL is a sum of a distance on an optical axis from a lens surface closest to the object side to a lens surface closest to the image side and a back focus at an air conversion length, f is a focal length of a whole system in a state where an object at infinity is in focus, f1 is a focal length of the first lens group R6f is the curvature radius of the surface of the sixth lens on the object side, and R5r is the curvature radius of the surface of the fifth lens on the image side.

In the imaging lens according to the present invention, it is preferable that the stop and the second lens group move integrally during focusing.

In the imaging lens according to the present invention, it is preferable that a lens of the second lens group closest to the object side is a positive lens, and, in the positive lens, an absolute value of a curvature radius of a surface on the object side is larger than an absolute value of a curvature radius of a surface on the image side.

In the imaging lens according to the present invention, it is preferable that the second lens group is composed of five lenses which consist of, in order from the object side, a positive lens, a negative lens, a positive lens, a negative lens, and a positive lens.

An imaging apparatus according to the present invention comprises the imaging lens according to the present invention.

In the present specification, the terms "consisting of ~" and "consists of ~" are used in a substantial sense, and the imaging lens may include not only the above-mentioned elements but also lenses substantially having no refractive powers, optical elements, which are not lenses, such as a stop, a filter, and a cover glass, and mechanism parts such as a lens flange, a lens barrel, and shaking correction mechanism.

In addition, reference signs of refractive powers of the lens groups, reference signs of refractive powers of the lenses, surface shapes of the lenses, and curvature radii of the surfaces of the lenses are assumed as those in paraxial regions in a case where some lenses have aspheric surfaces. Reference signs of curvature radii of surface shapes convex toward the object side are set to be positive, and reference signs of curvature radii of surface shapes convex toward the image side are set to be negative. Further, the above Conditional Expressions are based on the d line (a wavelength of 587.6 nm (nanometers)).

According to the present invention, in the lens system consisting of, in order from the object side, the first lens group that is fixed during focusing, the stop, and the positive second lens group that moves during focusing, the configuration of the first lens group is set in detail so as to satisfy a predetermined Conditional Expression, which makes it possible to provide a imaging lens having small fluctuation in spherical aberration and astigmatism, a wide angle, a small F number, and a favorable optical performance and an imaging apparatus comprising the imaging lens.

DESCRIPTION OF THE PREFERRED EMBODIMENTS

Figure 1:
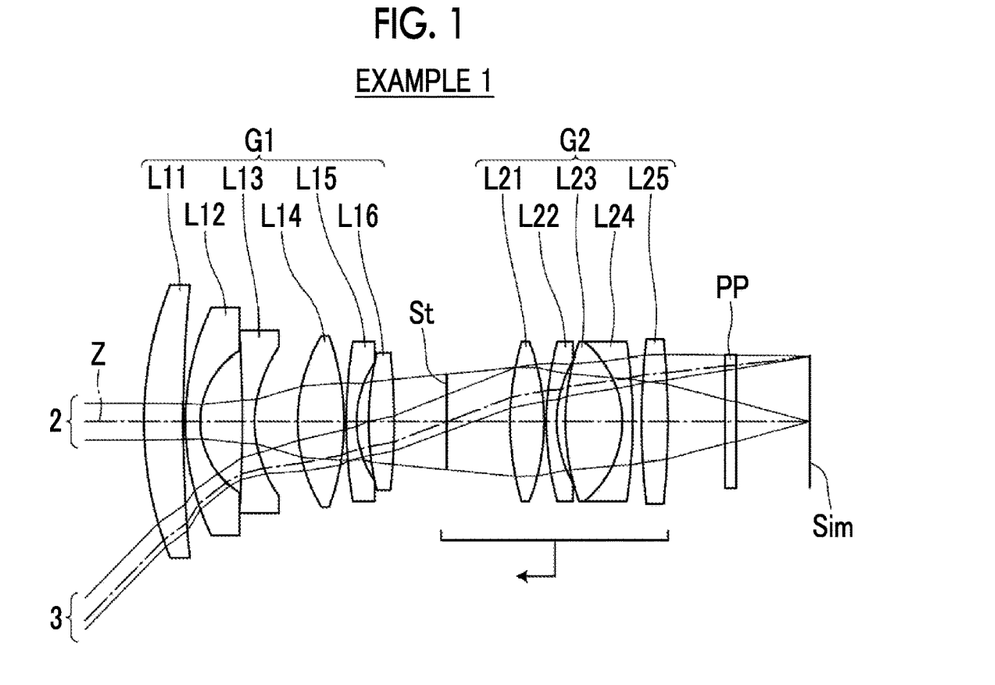
FIG. 1 is a cross-sectional view illustrating a configuration and optical paths of an imaging lens of Example 1 of the present invention.
Figure 2:
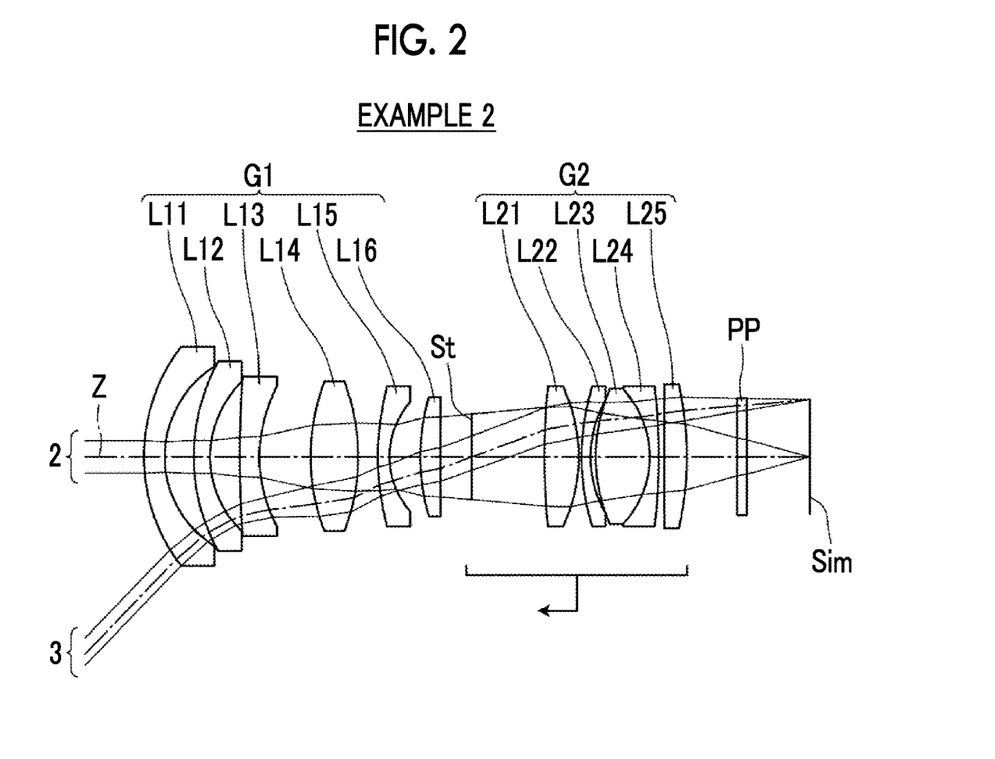
FIG. 2 is a cross-sectional view illustrating a configuration and optical paths of an imaging lens of Example 2 of the present invention.
Figure 3:
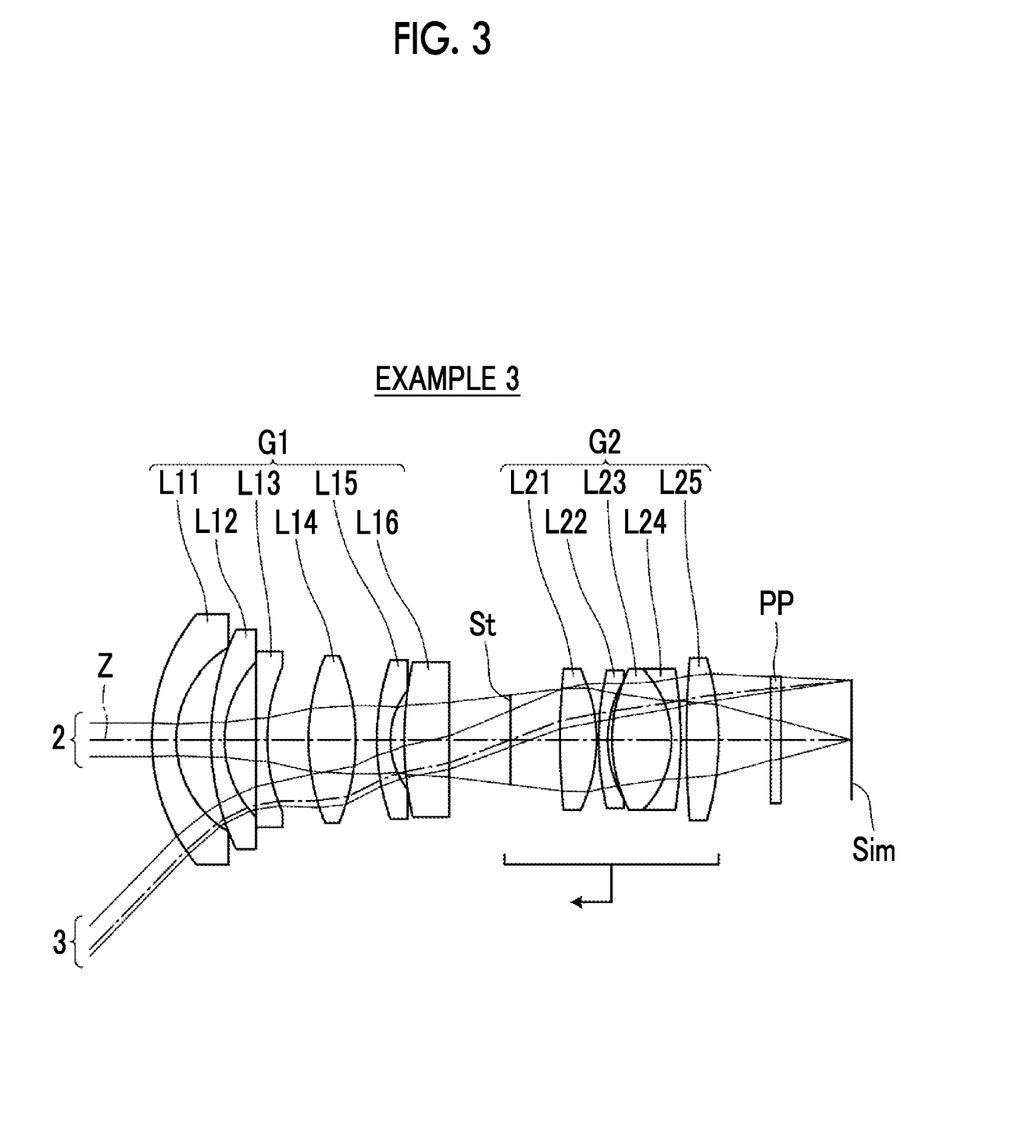
FIG. 3 is a cross-sectional view illustrating a configuration and optical paths of an imaging lens of Example 3 of the present invention.

Hereinafter, embodiments of the present invention will be described with reference to drawings. FIGS. 1 to 3 are cross-sectional views illustrating configurations and optical paths of imaging lenses according to an embodiment of the present invention, and respectively correspond to Examples 1 to 3 to be described later. Basic configurations and showing ways in examples shown in FIGS. 1 to 3 are the same, and will be hereinafter described with reference to mainly the example shown in FIG. 1. FIG. 1 shows the state where the object at infiniy is in focus, and shows optical paths of on-axis rays 2 and off-axis rays 3 with the maximum angle of view, where the left side is the object side thereof, and the right side thereof is the image side.

The imaging lens is a single focus lens and consists of a first lens group G1, an aperture stop St, and a second lens group G2 in order from the object side to the image side along the optical axis Z. It should be noted that the aperture stop St shown in FIG. 1 does not necessarily indicate its sizes or shapes, and indicates a position of the aperture stop St on the optical axis Z.

In order to apply the imaging lens to an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The first lens group G1 is fixed with respect to an image plane Sim during focusing and has a negative refractive power as a whole. The second lens group G2 moves during focusing and has a positive refractive power as a whole. A lens group (hereinafter referred to as a focus group) which moves during focusing is composed of the second lens group G2. With the above configuration, a retrofocus configuration in which negative and positive refractive powers are arranged in order from the object side as a whole is implemented, which is advantageous for securing a wide angle and back focus. Further, by forming the first lens group G1 on the object side as a negative lens group, the angle between the optical axis and the principal ray of the maximum angle of view entering from the object side to the focus group becomes small, which is advantageous for suppressing fluctuation in astigmatism due to focusing.

The first lens group G1 consists of successively in order from a position closet to the object side, a first lens L11 that is a meniscus lens having a convex surface toward the object side, a second lens L12 that is a meniscus lens having a convex surface toward the object side and having a negative refractive power, a third lens L13 having a negative refractive power, a fourth lens L14 having a biconvex shape and having a positive refractive power, a fifth lens L15 that is a meniscus lens having a convex surface toward the object side and having a negative refractive power, and a sixth lens L16 having a convex surface toward the object side and having a positive refractive power.

By forming the first lens L11 and the second lens L12 as meniscus lenses having convex surfaces toward the object side, distortion can be suppressed. By arranging the negative lens as the second lens L12 and the third lens L13, the off-axis principal ray entering the fourth lens L14 from the object side can be brought close to parallel to the optical axis Z. Accordingly, the effective diameter of the first lens group G1 can be suppressed, which is advantageous for achieving a wide angle while achieving reduction in size.

By forming the fourth lens L14 as a biconvex shape, positive refractive power can be allocated to the surface on the object side and the surface on the image side, and abrupt change in the direction of the light ray can be suppressed, and occurrence of spherical aberration can be suppressed.

By forming the surface the fifth lens L15 on the object side as the convex surface and the surface of the fifth lens L15 on the image side as a negative meniscus lens having a concave surface, the effect of correcting the spherical aberration can be made higher than the biconcave lens having the same refractive power, and the spherical aberration can be prevented from being insufficiently corrected. In addition, since the lens surface becomes nearly perpendicular to the off-axis principal ray, the astigmatism can be prevented from being excessively corrected.

By forming the sixth lens L16 as a positive lens having a convex surface toward the object side, insufficient correction of spherical aberration can be prevented. In addition, by alternately arranging the positive and negative lenses in the fourth lens L14 to the sixth lens L16 as described above, high-order aberrations of spherical aberration and astigmatism can be suppressed. In relation to aberration, the term "high-order" means an order equal to or higher than 5th order, which is the same in the following description.

The lens closest to the object side in the second lens group G2 is a positive lens and the positive lens is preferably configured such that the absolute value of the curvature radius of the surface on the object side is larger than the absolute value of the curvature radius of the surface on the image side surface. Since the off-axis principal ray is incident on the lens of the second lens group G2 closest to the object side at an angle with respect to the optical axis Z, if the absolute value of the curvature radius of the surface of the lens on the object side is reduced, the light ray is bent abruptly, and astigmatism occurs.

The second lens group G2 preferably consists of five lenses, that is, in order from the object side, a positive lens, a negative lens, a positive lens, a negative lens, and a positive lens. In such a case, by alternately arranging the positive and negative lenses, occurrence of high-order aberration of each of astigmatism, distortion and lateral chromatic aberration, which are off-axis aberrations, can be suppressed. By forming the lens closest to the image side as a positive lens, the incident angle of the principal ray of the off-axis rays incident onto the image plane Sim can be suppressed. In the example shown in FIG. 1, the second lens group G2 consists of five lenses L21 to L25 in order from the object side.

The imaging lens is composed to satisfy following Conditional Expression (1).

$$-0.4 < f/f1 < -0.2 \tag{1}$$

where, f is a focal length of a whole system in a state where an object at infinity is in focus, and f1 is a focal length of the first lens group.

By not allowing the result of Conditional Expression (1) to be equal to or less than the lower limit, the angle of the marginal ray incident on the second lens group G2 from the object side with respect to the optical axis Z can be limited, and change in ray height in the second lens group G2 during focusing can be suppressed, and fluctuation of spherical aberration can be suppressed. By not allowing the result of Conditional Expression (1) to be equal to or greater than the upper limit, the marginal ray incident onto the second lens group G2 from the object side can be prevented from being parallel to the optical axis Z, and the diameter of the incident ray can be secured, which makes it easy to realize an optical system having a small F number. In order to enhance the effect of Conditional Expression (1), it is preferable that Conditional Expression (1-1) is satisfied.

$$-0.37 < f/f1 < -0.22 \tag{1-1}$$

The imaging lens is composed to satisfy following Conditional Expression (2).

$$0.3 < (R6f - R5r)/(R6f + R5r) < 0.8 \tag{2}$$

where

R6f is the curvature radius of the surface of the sixth lens on the object side, R5r is the curvature radius of the surface of the fifth lens on the image side.

Conditional Expression (2) is an expression about a shape of an air lens which is formed between the fifth lens L15 and the sixth lens L16. By forming the shape of the air lens so as to satisfy Conditional Expression (2), it is easy to suppress occurrence of spherical aberration in the first lens group G1 and to suppress fluctuation in aberration due to focusing. As described above, by forming the surface of the fifth lens L15 on the image side as a concave surface and the surface of the sixth lens L16 on the object side as a convex surface, and by not allowing the result of Conditional Expression (2) to be equal to or less than the lower limit, it is possible to make a difference between the optical path length of the on-axis ray and the optical path length of the off-axis ray in the air lens portion, and to correct high-order astigmatism. By not allowing the result of Conditional Expression (2) to be equal to or greater than the upper limit, spherical aberration, astigmatism, and axial chromatic aberration can be prevented from being excessively corrected. In order to enhance the effect of Conditional Expression (2), it is preferable that Conditional Expression (2-1) is satisfied.

$$0.4 < (R6f - R5r)/(R6f + R5r) < 0.65 \tag{2-1}$$

It is preferable that the imaging lens satisfies at least one or an arbitrary combination of following Conditional Expressions (3) to (6).

$$1.68 < N \min \tag{3},$$

$$32 < \text{vave} \tag{4},$$

$$0 < vd4 - vd6 < 40 \tag{5, and}$$

$$8 < TTL/f < 12 \tag{6},$$

where,

Nmin is the refractive index of a d line of the negative lens having the smallest refractive index at the d line in the first lens, the second lens and the third lens, vave is the average value of Abbe numbers of the negative lenses based on the d line in the first lens, the second lens and the third lens, vd4 is an Abbe number of the fourth lens based on a d line, vd6 is an Abbe number of the sixth lens based on a d line, TTL is the sum of the distance on an optical axis from a lens surface closest to the object side to a lens surface closest to the image side and a back focus at an air conversion length, and f is a focal length of a whole system in a state where an object at infinity is in focus.

By satisfying Conditional Expression (3), it is advantageous to suppress the effective diameter of the first lens group G1, secure the peripheral light amount ratio, and suppress distortion. Further, it is preferable to satisfy Conditional Expression (3-1). By not allowing the result of Conditional Expression (3-1) to be equal to or smaller than the lower limit, an effect relating to Conditional Expression (3) can be increased. By not allowing the result of Conditional Expression (3-1) to be equal to or greater than the upper limit, a material with low dispersion can be selected and lateral chromatic aberration can be suppressed.

$$1.72 < Nmin < 1.9 \quad (3\text{-}1)$$

By satisfying Conditional Expression (4), occurrence of lateral chromatic aberration can be suppressed. Further, it is preferable to satisfy Conditional Expression (4-1). By not allowing the result of Conditional Expression (4-1) to be equal to or smaller than the lower limit, an effect relating to Conditional Expression (4) can be increased. By not allowing Conditional Expression (4-1) to be equal to or greater than the upper limit, a material having a high refractive index can be selected, which is advantageous for suppressing the effective diameter, securing the peripheral light amount ratio, and suppressing the distortion.

$$36 < vave < 55 \quad (4\text{-}1)$$

Conditional Expression (5) is an expression concerning the difference between the Abbe numbers of the two positive lenses in the first lens group G1. By setting the difference within the range of Conditional Expression (5), axial chromatic aberration and lateral chromatic aberration can be suppressed within an appropriate range. In order to enhance the effect relating to Conditional Expression (5), it is more preferable that Conditional Expression (5-1) is satisfied.

$$19 < vd4 - vd6 < 36 \quad (5\text{-}1)$$

Not allowing the result of Conditional Expression (6) to be equal to or less than the lower limit is advantageous for securing sufficient back focus and securing the movement amount of the focus group during focusing. By not allowing the result of Conditional Expression (6) to be equal to or greater than the upper limit, increase(s) in the effective diameter of the lens closest to the object side and/or the effective diameter of the lens closest to the image side, which may occur because the total length of the lens system becomes too long, can be prevented. In order to enhance the effect relating to Conditional Expression (6), it is more preferable that Conditional Expression (6-1) is satisfied.

$$9 < TTL/f < 11 \quad (6\text{-}1)$$

It is preferable that the aperture stop St moves integrally with the second lens group G2 during focusing. In this case, the fluctuation in off-axis aberration due to focusing can be suppressed. During focusing from a long range object to a short range object, it is preferable that the second lens group G2 moves from the image side to the object side. By setting the moving direction of the second lens group G2 during focusing to the above-mentioned direction while satisfying the conditional expression (1), increase in size of the lens system, which may occur because the spacing between the first lens group G1 and the second lens group G2 becomes too large during focusing on the short range object, can be prevented. The arrow under the aperture stop St and the second lens group G2 of FIG. 1 indicates a direction in which the second lens group G2 move during focusing from the long range object to the short range object.

The first lens L11 of the first lens group G1 may be a positive lens or a negative lens. The surface of the third lens L13 on the image side may be a concave surface, and in such a case, it is advantageous for widening the angle. All the lenses of the first lens group G1 can be non-cemented single lenses. For example, the second lens group G2 may consist of, in order from the object side, a biconvex lens, a negative meniscus lens having a convex surface toward the object side; a biconvex lens, a negative meniscus lens having a concave surface toward the object side and a biconvex lens.

The above-mentioned preferred configurations and/or available configurations may be any combinations, and it is preferable to selectively adopt the configurations in accordance with required specification. According to the present embodiment, it is possible to realize an imaging lens that has small fluctuation in spherical aberration and astigmatism due to focusing, has a wide angle and a small F number, and has a favorable optical performance Here, the term "wide angle" means that the maximum total angle of view is larger than 75 degrees, and the phrase "small F number" means that the F number is less than 3.

Next, numerical examples of the imaging lens of the embodiment of the present invention will be described.

Example 1

A lens configuration of an imaging lens of Example 1 is shown in FIG. 1, and a configuration and a method thereof shown in the drawing is as described above. Therefore, repeated description is partially omitted herein. The imaging lens of Example 1 consists of, in order from the object side: the first lens group G1 that has a negative refractive power, the aperture stop St; and the second lens group G2 that has a positive refractive power. During focusing from an object at infinity to a short range object, the first lens group G1 remains fixed with respect to the image plane Sim, and the second lens group G2 and the aperture stop St integrally move from the image side to the object side. The first lens group G1 consists of the six lenses, that is, in order from the object side, the first lens L11 to the sixth L16, and the second lens group G2 consists of five lenses, that is, in order from the object side, the lenses L21 to L25. It should be noted that the two-group configuration, the reference signs of the refractive power of each lens group, the number of lenses of the first lens group G1, the number of lenses of the second lens group G2, and the behavior during focusing are the same for the imaging lens of Examples described later.

Table 1 shows basic lens data of the imaging lens of Example 1, and Table 2 shows specification and variable surface spacings. In Table 1, the column of Si shows a surface number i (i=1, 2, 3, . . . ) attached to an i-th surface of the elements, where i sequentially increases toward the image side in a case where an object side surface of an element closest to the object side is regarded as a first surface. The column of Ri shows a radius of curvature of the i-th surface. The column of Di shows a distance on the optical axis Z between the i-th surface and an (i+1)th surface. In Table 1, the column of Ndj shows a refractive index of a j-th (j=1, 2, 3, . . . ) element at the d line (a wavelength of 587.6 nm(nanometers)), where j sequentially increases toward the image side in a case where the element closest to the object side is regarded as the first element. The column of vdj shows an Abbe number of the j-th element based on a d line.

Here, reference signs of curvature radii of surface shapes convex toward the object side are set to be positive, and reference signs of curvature radii of surface shapes convex toward the image side are set to be negative. Table 1 additionally shows the aperture stop St and the optical member PP. In Table 1, in a place of a surface number of a surface corresponding to the aperture stop St, the surface number and a term of (St) are noted. A value at the bottom place of Di indicates a distance between the image plane Sim and the surface closest to the image side in the table. In Table 1, the variable surface spacings, which are variable during focusing, are referenced by the reference signs DD[ ], and are written into places of Di, where object side surface numbers of spacings are noted in [ ].

In Table 2, values of the focal length f of the whole system in the state where the object at infinity is in focus, and the focal length fnear of the whole system in the state where the object having the object distance of 100 mm (millimeters) is in focus, the F number FNo, the maximum total angle of view 2ω, and the variable surface distance are shown based on the d line. [°] in the place of 2ω indicates that the unit thereof is a degree. In Table 2, the column denoted by the "infinity" shows respective values thereof in a state where the object at infinity is in focus, and the column denoted by "100 mm" shows respective values thereof in a state where an object at an object distance of 100 mm (millimeters) is in focus.

In data of each table, a degree is used as a unit of an angle, and millimeter (mm) is used as a unit of a length, but appropriate different units may be used since the optical system can be used even in a case where the system is enlarged or reduced in proportion. Further, each of the following tables shows numerical values rounded off to predetermined decimal places.

TABLE 11

| Example 1 | | | | |
|---|---|---|---|---|
| Si | Ri | Di | Ndj | vdj |
| 1 | 32.13694 | 3.467 | 1.51633 | 64.14 |
| 2 | 124.45732 | 0.200 | | |
| 3 | 23.03640 | 1.300 | 1.89190 | 37.13 |
| 4 | 7.31853 | 3.712 | | |
| 5 | −135.32806 | 1.100 | 1.89201 | 38.80 |
| 6 | 11.22917 | 3.748 | | |
| 7 | 14.46206 | 4.102 | 1.70860 | 44.63 |
| 8 | −21.79582 | 0.200 | | |
| 9 | 43.57630 | 0.900 | 1.82909 | 45.09 |
| 10 | 9.33435 | 1.070 | | |
| 11 | 25.47988 | 2.253 | 1.83363 | 23.32 |
| 12 | −54.41039 | DD[12] | | |
| 13(St) | ∞ | 5.500 | | |
| 14 | 24.76426 | 3.000 | 1.65764 | 58.62 |
| 15 | −19.26604 | 0.200 | | |
| 16 | 25.53764 | 0.920 | 1.79229 | 25.39 |
| 17 | 10.82997 | 0.776 | | |
| 18 | 21.25506 | 5.010 | 1.72670 | 55.17 |

TABLE 11-continued

| Example 1 | | | | |
|---|---|---|---|---|
| Si | Ri | Di | Ndj | vdj |
| 19 | −8.94484 | 0.900 | 1.83814 | 26.53 |
| 20 | −48.45378 | 0.805 | | |
| 21 | 62.60746 | 2.300 | 1.80783 | 47.22 |
| 22 | −72.15691 | DD[22] | | |
| 23 | ∞ | 1.000 | 1.51633 | 64.14 |
| 24 | ∞ | 6.513 | | |

TABLE 2

| Example 1 | | |
|---|---|---|
| | Infinite distance | 100 mm |
| f | 6.235 | — |
| fnear | — | 6.285 |
| FNo. | 1.94 | 1.97 |
| 2ω[°] | 91.6 | 91.0 |
| DD[12] | 4.616 | 4.224 |
| DD[22] | 5.000 | 5.392 |

Figure 4:
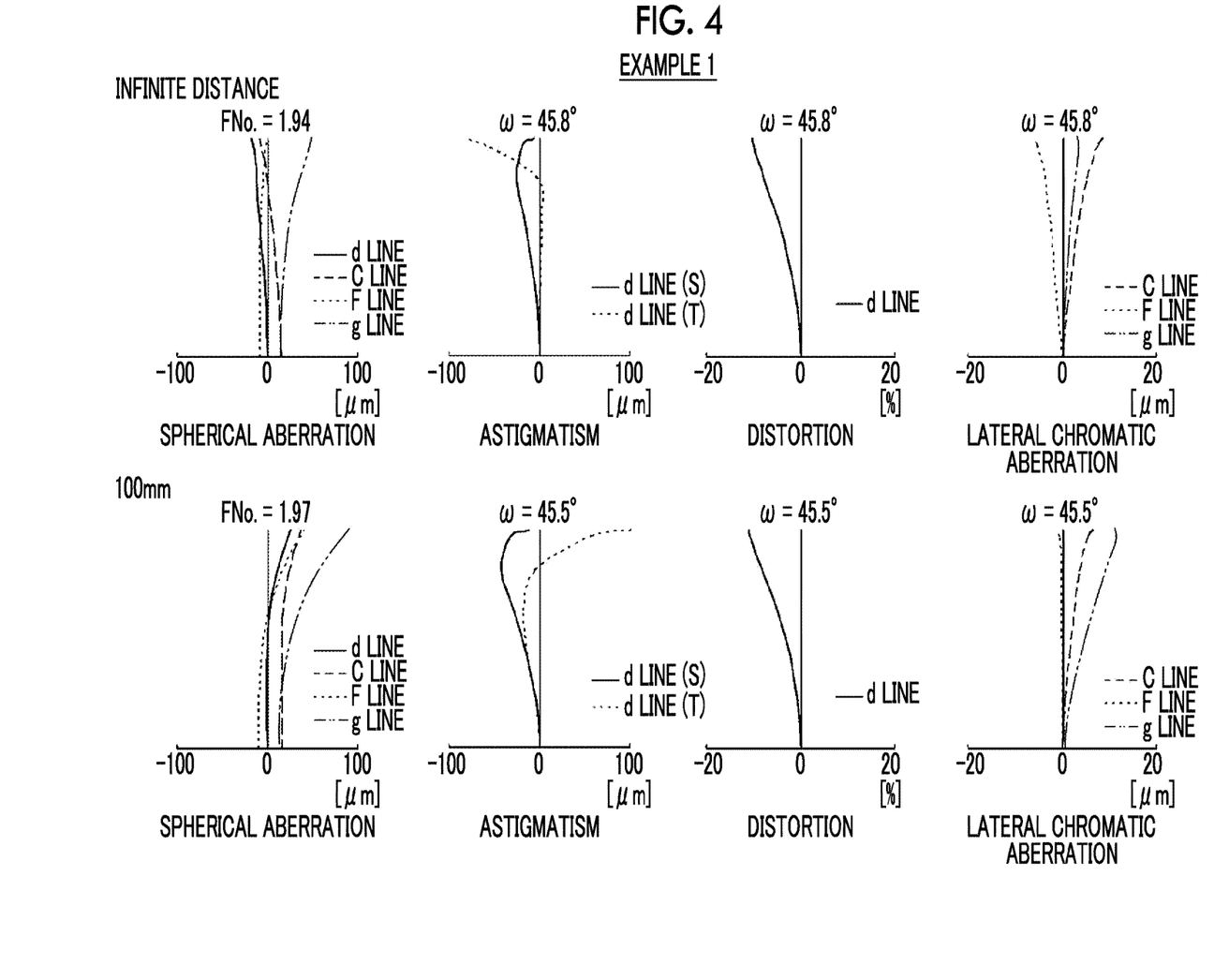
FIG. 4 is a diagram of aberrations of the imaging lens of Example 1 of the present invention, where the diagram includes spherical aberration diagram, astigmatism diagram, distortion diagram, and lateral chromatic aberration diagram, in order from the left side thereof.

FIG. 4 shows aberration diagrams of the imaging lens of Example 1. In order from the left side on the upper side of FIG. 4 denoted by the "infinite distance", spherical aberration, astigmatism, distortion, and lateral chromatic aberration (chromatic aberration of magnification) in a state where the object at infinity is in focus are shown. In order from the left side on the lower side denoted by the "100 mm", spherical aberration, astigmatism, distortion, and lateral chromatic aberration in a state where the object at the object distance of 100 mm (millimeters) is in focus are shown. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the black solid line, the long dashed line, the short dashed line, and the chain double-dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain double-dashed line. In the spherical aberration diagram, FNo indicates an F number. In the other aberration diagrams, w indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 5:
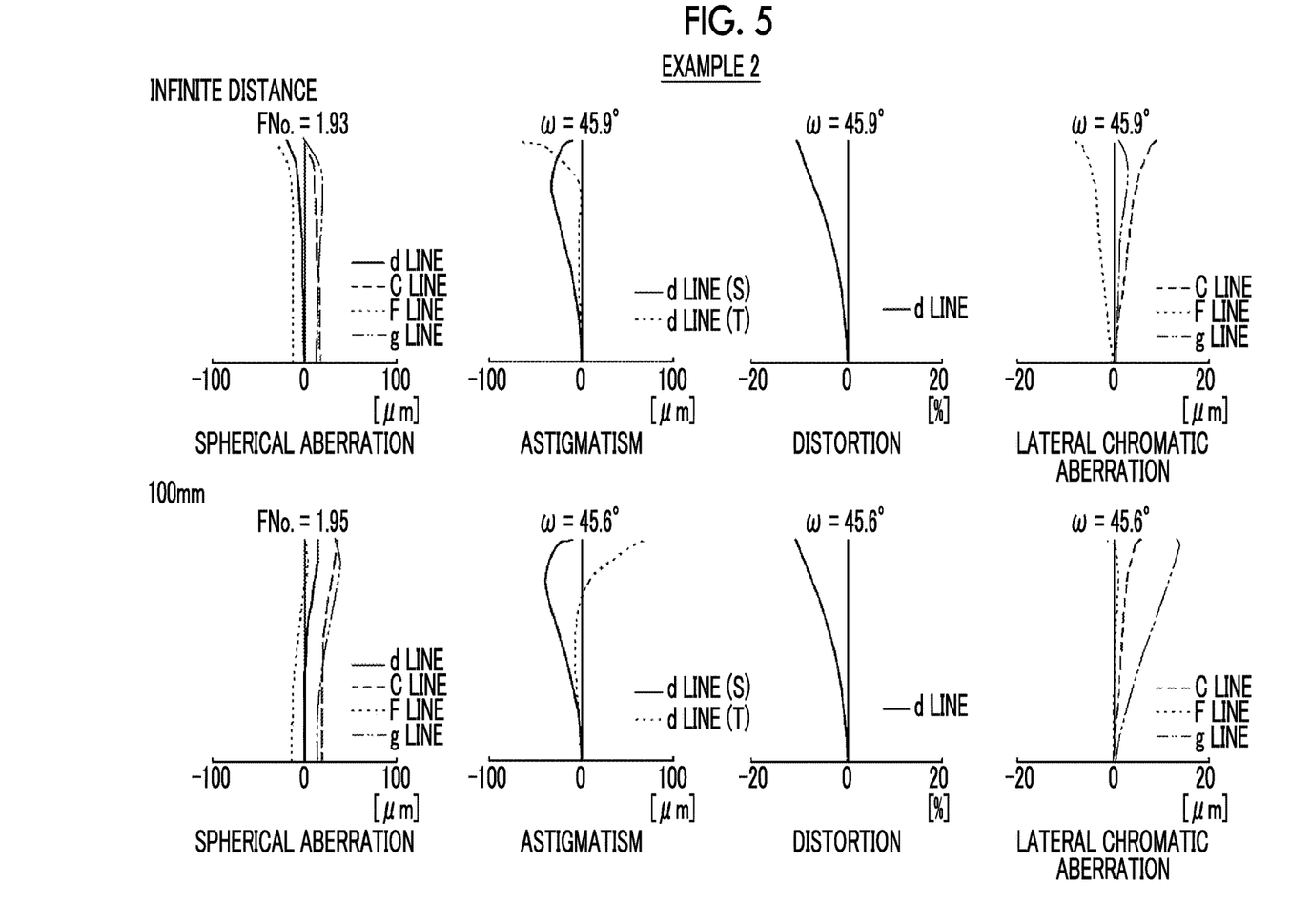
FIG. 5 is a diagram of aberrations of the imaging lens of Example 2 of the present invention, where the diagram includes spherical aberration diagram, astigmatism diagram, distortion diagram, and lateral chromatic aberration diagram, in order from the left side thereof.

FIG. 2 shows a lens configuration of the imaging lens of Example 2. Table 3 shows basic lens data of the imaging lens of Example 2, Table 4 shows specification and variable surface spacings, and FIG. 5 shows aberration diagrams thereof.

TABLE 3

Example 2

| Si | Ri | Di | Ndj | vdj |
|---|---|---|---|---|
| 1 | 18.00601 | 2.099 | 1.77250 | 49.60 |
| 2 | 10.57761 | 2.931 | | |
| 3 | 19.51459 | 1.647 | 1.85025 | 30.05 |
| 4 | 10.38297 | 2.999 | | |
| 5 | 114.17207 | 1.940 | 1.80400 | 46.58 |
| 6 | 14.94225 | 5.151 | | |
| 7 | 20.80895 | 4.798 | 1.72916 | 54.68 |
| 8 | −20.80895 | 2.000 | | |
| 9 | 27.54248 | 1.153 | 1.85150 | 40.78 |
| 10 | 8.26018 | 3.118 | | |
| 11 | 21.41521 | 2.012 | 1.84666 | 23.78 |
| 12 | 327.02495 | DD[12] | | |
| 13(St) | ∞ | 7.271 | | |
| 14 | 69.62238 | 3.459 | 1.72000 | 43.69 |
| 15 | −16.39164 | 0.297 | | |
| 16 | 23.65244 | 0.900 | 1.58144 | 40.75 |
| 17 | 11.48962 | 0.527 | | |
| 18 | 16.91028 | 5.445 | 1.61800 | 63.33 |
| 19 | −9.84137 | 0.900 | 1.89286 | 20.36 |
| 20 | −61.61543 | 0.550 | | |
| 21 | 1061.10716 | 2.300 | 1.72916 | 54.68 |
| 22 | −31.93063 | DD[22] | | |
| 23 | ∞ | 1.000 | 1.51633 | 64.14 |
| 24 | ∞ | 6.361 | | |

TABLE 4

Example 2

| | Infinity distance | 100 mm |
|---|---|---|
| f | 6.235 | — |
| fnear | — | 6.274 |
| FNo. | 1.93 | 1.95 |
| 2ω[°] | 91.8 | 91.2 |
| DD[12] | 3.100 | 2.728 |
| DD[22] | 5.000 | 5.372 |

Example 3

Figure 6:
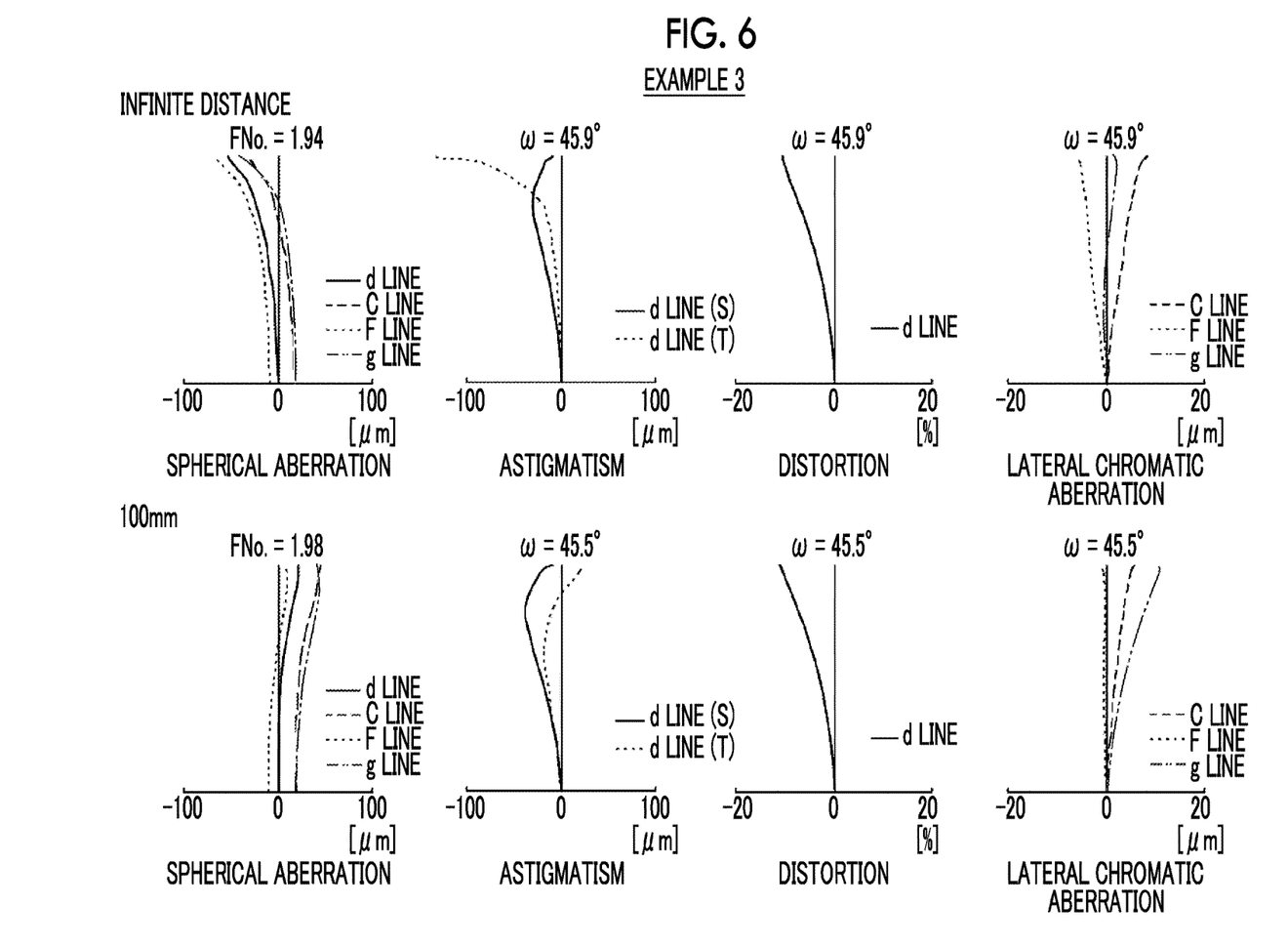
FIG. 6 is a diagram of aberrations of the imaging lens of Example 3 of the present invention, where the diagram includes spherical aberration diagram, astigmatism diagram, distortion diagram, and lateral chromatic aberration diagram, in order from the left side thereof.

FIG. 3 shows a lens configuration of the imaging lens of Example 3. Table 5 shows basic lens data of the imaging lens of Example 3, Table 6 shows specification and variable surface spacings, and FIG. 6 shows aberration diagrams thereof.

TABLE 5

Example 3

| Si | Ri | Di | Ndj | vdj |
|---|---|---|---|---|
| 1 | 18.87585 | 2.350 | 1.77250 | 49.60 |
| 2 | 10.26643 | 3.340 | | |
| 3 | 23.98787 | 1.300 | 1.77250 | 49.60 |
| 4 | 10.65060 | 3.010 | | |
| 5 | ∞ | 1.100 | 1.77250 | 49.60 |
| 6 | 17.41308 | 3.970 | | |
| 7 | 20.84659 | 4.530 | 1.73400 | 51.47 |
| 8 | −20.84659 | 2.050 | | |
| 9 | 23.15832 | 1.310 | 1.70154 | 41.24 |
| 10 | 7.83393 | 1.310 | | |
| 11 | 33.88908 | 4.320 | 1.84666 | 23.78 |
| 12 | ∞ | DD[12] | | |
| 13(St) | ∞ | 4.770 | | |
| 14 | 64.21094 | 3.530 | 1.77250 | 49.60 |
| 15 | −15.56906 | 0.200 | | |
| 16 | 28.28340 | 0.870 | 1.58144 | 40.89 |
| 17 | 11.27458 | 0.420 | | |
| 18 | 14.91348 | 5.720 | 1.48749 | 70.44 |
| 19 | −9.64400 | 0.880 | 1.84666 | 23.78 |
| 20 | −43.60529 | 0.550 | | |
| 21 | 90.45840 | 3.100 | 1.77250 | 49.60 |
| 22 | −26.98842 | DD[22] | | |
| 23 | ∞ | 1.000 | 1.51633 | 64.14 |
| 24 | ∞ | 6.804 | | |

TABLE 6

Example 3

| | Infinity distance | 100 mm |
|---|---|---|
| f | 6.231 | — |
| fnear | — | 6.295 |
| FNo. | 1.94 | 1.98 |
| 2ω[°] | 91.8 | 91.0 |
| DD[12] | 5.810 | 5.405 |
| DD[22] | 5.000 | 5.405 |

Table 7 shows values corresponding to Conditional Expressions (1) to (6) of the imaging lenses of Examples 1 to 3. The values shown in Table 7 are based on the d line. The first lens L11 of Example 1 is a positive lens, and the first lens L11 of Example 2 and Example 3 is a negative lens. In calculating the corresponding values of Conditional Expressions (3) and (4), the first lens L11 is excluded from calculation targets for Example 1.

TABLE 7

| Expression number | | Example1 | Example2 | Example3 |
|---|---|---|---|---|
| (1) | f/f1 | −0.286 | −0.243 | −0.356 |
| (2) | (R6f−R5r)/(R6f+R5r) | 0.464 | 0.443 | 0.624 |
| (3) | Nmin | 1.89190 | 1.77250 | 1.77250 |
| (4) | vave | 37.97 | 42.08 | 49.06 |
| (5) | vd4−vd6 | 21.31 | 30.90 | 27.69 |
| (6) | TTL/f | 9.343 | 10.685 | 10.737 |

As can be seen from the above-mentioned data, the imaging lenses of Examples 1 to 3 have a small F number of less than two and have a wide angle with the maximum total angle of view of 90 degrees or more, and in the imaging lenses, fluctuation in aberration due focusing is small, aberrations are each well corrected, and high optical performance is achieved.

Figure 7:
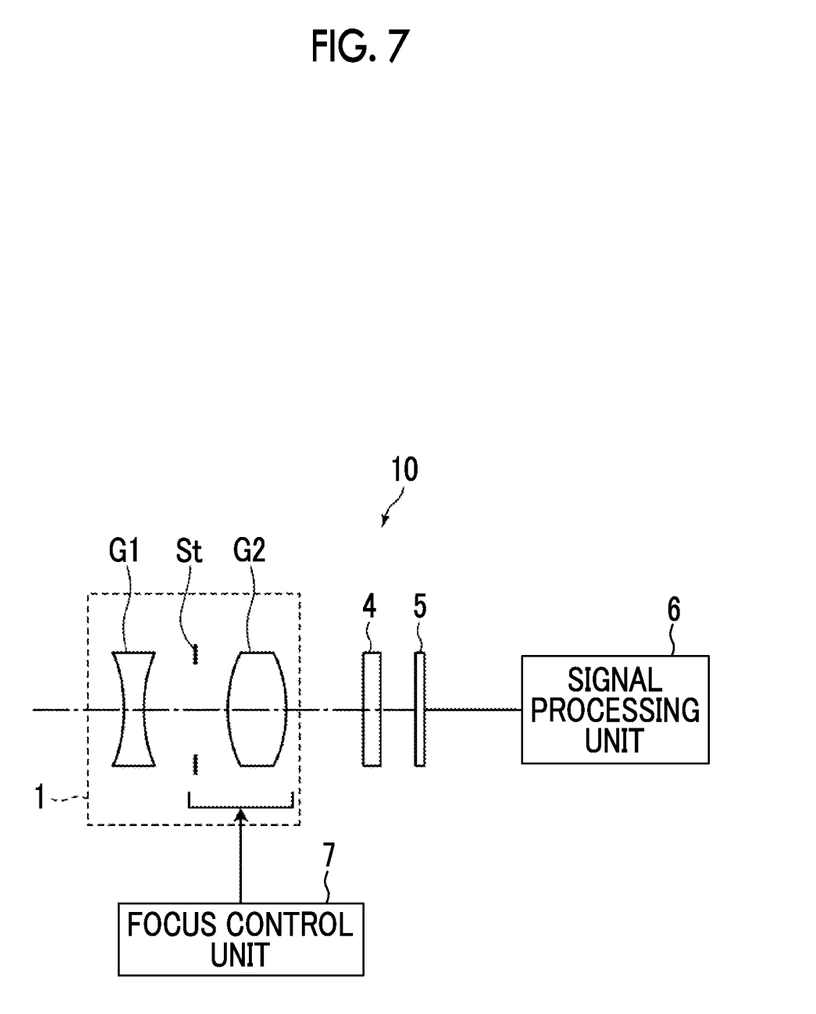
FIG. 7 is a schematic configuration diagram of an imaging apparatus according to an embodiment of the present invention.

Next, an imaging apparatus according to an embodiment of the present invention will be described. FIG. 7 is a schematic configuration diagram of an imaging apparatus 10 using the imaging lens 1 according to the embodiment of the present invention as an example of an imaging apparatus of the embodiment of the present invention. As the imaging apparatus 10, for example, there is an FA camera, a machine vision camera, or a surveillance camera.

The imaging apparatus 10 comprises the imaging lens 1, a filter 4 that is disposed on the image side of the imaging lens 1, an imaging element 5, a signal processing unit 6 that performs processing of calculating a signal which is output from the imaging element 5, and a focus control unit 7 that is for performing focusing of the imaging lens 1. FIG. 7 schematically shows the first lens group G1, the aperture stop St, and the second lens group G2 which are belonging to the imaging lens 1. In addition, FIG. 7 shows an example in which focusing is performed by integrally moving the second lens group G2 and the aperture stop St through the focus control unit 7, but a focusing method of the imaging apparatus of the embodiment of the present invention is not limited to this example. The imaging element 5 captures an image of a subject formed by the imaging lens 1 and converts the image into an electric signal, for example, using a Charge Coupled Device (CCD) or a Complementary Metal Oxide Semiconductor (CMOS). The imaging element 5 is disposed such that the imaging surface thereof is coplanar with the image plane of the imaging lens 1. Since the imaging apparatus 10 of the present embodiment comprises the imaging lens 1, the imaging apparatus 10 can appropriately cope with a change in an object distance, and acquire a favorable image with the wide angle.

The present invention has been hitherto described through embodiments and examples, but the present invention is not limited to the above-mentioned embodiments and examples, and may be modified into various forms. For example, values such as the curvature radius, the surface distance, the refractive index, the Abbe number, and the aspheric coefficient of each lens are not limited to the values shown in the numerical examples, and different values may be used therefor.

For example, in each example, the lens system, which performs focusing from the object at infinity to the short range object, is used. However, it is needless to say that the present invention can be applied to an imaging lens which performs focusing from a long range object at a finite distance to a short range object.

The imaging apparatus according to the embodiment of the present invention is also not limited to the above-mentioned examples, but may include various embodiments such as a video camera, a digital camera, a film camera, and a cinema camera.

What is claimed is:

1. An imaging lens consisting of, in order from an object side:
   a first lens group fixed with respect to an image plane during focusing and having a negative refractive power as a whole;
   a stop; and
   a second lens group moving during focusing and having a positive refractive power as a whole,
   wherein the first lens group consists of, in order from the object side, a first lens that is a meniscus lens having a convex surface toward the object side, a second lens that is a meniscus lens having a convex surface toward the object side and having a negative refractive power, a third lens having a negative refractive power, a fourth lens having a biconvex shape and having a positive refractive power, a fifth lens that is a meniscus lens having a convex surface toward the object side and having a negative refractive power, and a sixth lens having a convex surface toward the object side and having a positive refractive power, and wherein Conditional Expressions (1) and (2) are satisfied, $$-0.4 < f/f1 < -0.2 \quad (1), \text{ and}$$

$$0.3 < (R6f - R5r)/(R6f + R5r) < 0.8 \quad (2),$$

where f is a focal length of a whole system in a state where an object at infinity is in focus,
   f1 is a focal length of the first lens group,
   R6f is a curvature radius of a surface of the sixth lens on the object side, and
   R5r is a curvature radius of a surface of the fifth lens on an image side.

2. The imaging lens according to claim 1, wherein Conditional Expression (3) is satisfied, $$1.68 < Nmin \quad (3),$$

where Nmin is a refractive index of the negative lens having the smallest refractive index at a d line in the first lens, the second lens and the third lens.

3. The imaging lens according to claim 1, wherein following Conditional Expression (4) is satisfied, $$32 < vave \quad (4),$$

where vave is an average value of Abbe numbers of the negative lenses based on a d line in the first lens, the second lens and the third lens.

4. The imaging lens according to claim 1, wherein following Conditional Expression (5) is satisfied, $$0 < vd4 - vd6 < 40 \quad (5),$$

where vd4 is an Abbe number of the fourth lens based on a d line, and
   vd6 is an Abbe number of the sixth lens based on a d line.

5. The imaging lens according to claim 1, wherein the stop and the second lens group move integrally during focusing.

6. The imaging lens according to claim 1, wherein a lens of the second lens group closest to the object side is a positive lens, and, in the positive lens, an absolute value of a curvature radius of a surface on the object side is larger than an absolute value of a curvature radius of a surface on the image side.

7. The imaging lens according to claim 1, wherein the second lens group is composed of five lenses which consist of, in order from the object side, a positive lens, a negative lens, a positive lens, a negative lens, and a positive lens.

8. The imaging lens according to claim 1, wherein following Conditional Expression (6) is satisfied, $$8 < TTL/f < 12 \quad (6),$$

where TTL is a sum of a distance on an optical axis from a lens surface closest to the object side to a lens surface closest to the image side and a back focus at an air conversion length.

9. The imaging lens according to claim 1, wherein following Conditional Expression (1-1) is satisfied, $$-0.37 < f/f1 < -0.22 \quad (1\text{-}1).$$

10. The imaging lens according to claim 1, wherein following Conditional Expression (2-1) is satisfied, $$0.4 < (R6f - R5r)/(R6f + R5r) < 0.65 \quad (2\text{-}1).$$

11. The imaging lens according to claim 1, wherein following Conditional Expression (3-1) is satisfied, $$1.72 < Nmin < 1.9 \quad (3\text{-}1),$$

where Nmin is a refractive index of the negative lens having the smallest refractive index at a d line in the first lens, the second lens and the third lens.

12. The imaging lens according to claim 1,
wherein following Conditional Expression (4-1) is satisfied, $$36 < vave < 55 \tag{4-1}$$

where vave is an average value of Abbe numbers of the negative lenses based on a d line in the first lens, the second lens and the third lens.

13. The imaging lens according to claim 1,
wherein following Conditional Expression (5-1) is satisfied, $$19 < vd4 - vd6 < 36 \tag{5-1}$$

where vd4 is an Abbe number of the fourth lens based on a d line, and
vd6 is an Abbe number of the sixth lens based on a d line.

14. The imaging lens according to claim 1,
wherein following Conditional Expression (6-1) is satisfied, $$9 < TTL/f < 11 \tag{6-1}$$

where TTL is a sum of a distance on an optical axis from a lens surface closest to the object side to a lens surface closest to the image side and a back focus at an air conversion length.

15. An imaging apparatus comprising the imaging lens according to claim 1.

* * * * *